(12) United States Patent
Grazzi et al.

(10) Patent No.: US 8,450,422 B2
(45) Date of Patent: May 28, 2013

(54) POLYOLEFIN MASTERBATCH AND COMPOSITION SUITABLE FOR INJECTION MOLDING

(75) Inventors: Michele Grazzi, Casaglia (IT); Giampaolo Pellegatti, Boara (IT)

(73) Assignee: Basell Poliolefine Italia S.r.l., Milan (IT)

( * ) Notice: Subject to any disclaimer, the term of this patent is extended or adjusted under 35 U.S.C. 154(b) by 0 days.

(21) Appl. No.: 13/256,592

(22) PCT Filed: Mar. 17, 2010

(86) PCT No.: PCT/EP2010/053431
§ 371 (c)(1),
(2), (4) Date: Sep. 14, 2011

(87) PCT Pub. No.: WO2010/112337
PCT Pub. Date: Oct. 7, 2010

(65) Prior Publication Data
US 2012/0016087 A1    Jan. 19, 2012

Related U.S. Application Data

(60) Provisional application No. 61/214,417, filed on Apr. 23, 2009.

(30) Foreign Application Priority Data

Mar. 31, 2009    (EP) .................... 09156935

(51) Int. Cl.
*C08F 8/00*    (2006.01)
*C08L 23/00*    (2006.01)
(52) U.S. Cl.
USPC ......................... 525/191; 525/240

(58) Field of Classification Search
USPC .................................. 525/191, 240
See application file for complete search history.

(56) References Cited

U.S. PATENT DOCUMENTS

| | | | |
|---|---|---|---|
| 5,145,819 A | 9/1992 | Winter et al. | |
| 6,156,844 A | 12/2000 | Hashimoto et al. | |
| 7,728,077 B2 * | 6/2010 | Pelliconi et al. | 525/191 |
| 2005/0113521 A1 | 5/2005 | Pelliconi | |
| 2006/0194924 A1 | 8/2006 | Pelliconi | |
| 2007/0232765 A1 | 10/2007 | Pelliconi et al. | |

FOREIGN PATENT DOCUMENTS

| | | |
|---|---|---|
| EP | 0129368 | 12/1984 |
| EP | 0416815 | 3/1991 |
| EP | 0420436 | 4/1991 |
| EP | 0361493 | 11/1994 |
| EP | 0643066 | 3/1995 |
| EP | 0671404 | 9/1995 |
| EP | 0728769 | 8/1996 |
| WO | WO-0026295 | 0/2000 |
| WO | WO-9104257 | 4/1991 |
| WO | WO-0228958 | 4/2002 |
| WO | WO-2005014715 | 2/2005 |

* cited by examiner

*Primary Examiner* — Nathan M Nutter

(57) ABSTRACT

A masterbatch composition comprising, all percent amounts being by weight:
A) 10-45% of a homopolymer or a copolymer of propylene;
B) 10-30% of a copolymer of propylene with ethylene, containing from 18 to 45% of ethylene;
C) 42-60% of a copolymer of propylene with ethylene, containing from 55 to 85% of ethylene;
said composition having a MFR L value from 0.01 to 10 g/10 min., a value of the intrinsic viscosity $[\eta]_{sol}$ of the fraction soluble in xylene at room temperature from 1.5 to 2.5 dl/g and a value of the ratio $[\eta]_{sol}$/MFR L equal to or lower than 6.

8 Claims, No Drawings

US 8,450,422 B2

POLYOLEFIN MASTERBATCH AND COMPOSITION SUITABLE FOR INJECTION MOLDING

This application is the U.S. national phase of International Application PCT/EP2010/053431, filed Mar. 17, 2010, claiming priority to European Application 09156935.0 filed Mar. 31, 2009 and the benefit under 35 U.S.C. 119(e) of U.S. Provisional Application No. 61/214,417, filed Apr. 23, 2009; the disclosures of International Application PCT/EP2010/053431, European Application 09156935.0 and U.S. Provisional Application No. 61/214,417, each as filed, are incorporated herein by reference.

The present invention relates to a polyolefin masterbatch which can be used to prepare polyolefin compositions suitable for injection molding into relatively large articles. More particularly, the polyolefin compositions can be injection molded into large objects which exhibit low values of thermal shrinkage in combination with enhanced mechanical properties, like impact strength and elongation at break.

An advantage of using a masterbatch composition is that it can be added to many and different kinds of polyolefins to achieve a final polyolefin composition ready for production, by injection molding, of large articles such as automobile bumpers. Thus there is a constant need for masterbatch compositions able to produce, by blending with various polyolefin materials, final compositions exhibiting a good balance of properties. In particular, the reduction of thermal shrinkage imparts a higher dimensional stability to the final articles.

In WO00/26295 polyolefin compositions with low values of coefficient of linear thermal expansion and good mechanical properties are described, comprising (by weight) from 40 to 60% of a broad molecular weight distribution propylene polymer having a polydispersity index from 5 to 15 and melt flow rate of from 80 to 200 g/10 min (according to ASTM-D 1238, condition L), and from 40 to 60% of a partially xylene-soluble olefin polymer rubber containing at least 65% by weight of ethylene, the $IV_S/IV_A$ ratio between the intrinsic viscosity ($IV_S$) of the portion soluble in xylene of the polyolefin composition at room temperature and the intrinsic viscosity ($IV_A$) of the said propylene polymer ranging from 2 to 2.5.

These compositions typically have a flexural modulus of from 650 to 1000 MPa.

In WO2005/014715 polyolefin compositions having flexural modulus values of higher than 1000 MPa, in particular higher than 1100 MPa, still maintaining a good balance of overall mechanical properties and low values of thermal shrinkage are described, comprising (percentage by weight):
A) from 60 to 85%, of a broad molecular weight distribution propylene polymer (component A) having a polydispersity index from 5 to 15 and melt flow rate of from 20 to 78 g/10 min, and
B) from 15 to 40 of a partially xylene-soluble olefin polymer rubber (component B) containing at least 65% by weight of ethylene.

In WO2005/103140 a masterbatch composition is described, comprising (percent by weight):
A) 15%-50% of a polypropylene component having a melt flow rate of from 1 to 250 g/10 min.; and
B) 50%-85% of an olefin polymer partially soluble in xylene at room temperature (about 25° C.), containing from 55% to 85% by weight of ethylene;
said masterbatch composition having (i) a value of the intrinsic viscosity [η] of the fraction soluble in xylene at room temperature ($[\eta]_{sol}$) equal to or lower than 2.9 dl/g and (ii) a value of the ratio MFR/$[\eta]_{sol}$ of the melt flow rate (MFR) value (of the total composition) to the [η] value of the fraction soluble in xylene at room temperature, equal to or lower than 4.

It has now been found that by properly selecting the kind and relative amounts of the propylene/ethylene copolymer components, it is possible to obtain a masterbatch composition with a particularly valuable set of physical and mechanical properties and particularly suited for preparing final polyolefin compositions having excellent dimensional stability.

In particular, by using the masterbatch compositions of the present invention, it is possible to obtain final compositions having high values of impact resistance and elongation at break, with very low values of thermal shrinkage.

Thus the present invention relates to a masterbatch composition comprising, all percent amounts being by weight:
A) 10-45% of a homopolymer of propylene or a copolymer of propylene with one or more comonomer(s) selected from ethylene and $CH_2=CHR$ alpha-olefins where R is a 2-8 carbon alkyl, which copolymer contains from 1 to 8% of comonomer(s);
B) 10-30% of a copolymer of propylene with ethylene, containing from 18 to 45%, preferably from 28 to 45%, more preferably from 28 to 40% of ethylene;
C) 42-60%, preferably 44-60%, more preferably 45-60% of a copolymer of propylene with ethylene, containing from 55 to 85%, preferably from 65 to 75% of ethylene;
said composition having a MFR L value from 0.01 to 10 g/10 min., a value of the intrinsic viscosity $[\eta]_{sol}$ of the fraction soluble in xylene at room temperature from 1.5 to 2.5 dl/g and a value of the ratio $[\eta]_{sol}$/MFR L equal to or lower than 6, preferably equal to or lower than 2.

The melt flow rate values (MFR) are measured according to ASTM-D 1238, condition L (230° C., with 2.16 kg load).

The melt flow rate of the masterbatch composition can preferably range from 0.1 to 10 g/10 min., more preferably from 1 to 10 g/10 min.

Illustrative $CH_2=CHR$ alpha-olefins that can be present in (A) include 1-butene, 1-pentene, 1-hexene, 4-methyl-1-pentene and 1-octene, with 1-butene being particularly preferred.

The components (B) and (C) used in the masterbatch composition of the present invention can optionally further contain a diene, the content of which is preferably of from 1 to 10% by weight, more preferably from 1 to 5% by weight.

Typically, component (A) is partially soluble in xylene at room temperature (about 25° C.). The content of fraction of component (A) which is soluble in xylene at room temperature is preferably equal to or lower than 10%, more preferably equal to or lower than 5% by weight. Such values of xylene-soluble content correspond to isotactic index values equal to or higher than 90%, preferably equal to or higher than 95%.

Preferably, component (A) has a MFR L value from 70 to 130 g/10 min., more preferably from 80 to 120 g/10 min.

Propylene homopolymers are preferred for use as component (A).

Typically, said components (B) and (C) are partially soluble in xylene at room temperature as well. The content of fraction of component (B) which is soluble in xylene at room temperature is preferably of 80% by weight or more, in particular from 80 to 95% by weight. The content of fraction of component (C) which is soluble in xylene at room temperature is preferably from 50 to 80% by weight, more preferably from 50 to 75% by weight.

Other preferred features for the masterbatch composition of the present invention are:
 ethylene content, with respect to the total weight of the composition, from 25% to 60% by weight, in particular from 30% to 50% by weight;

amount of fraction soluble in xylene at room temperature of the overall composition from 35% to 60% by weight.

The masterbatch composition of the present invention can be prepared by a sequential polymerization, comprising at least three sequential steps, wherein components (A), (B) and (C) are prepared in separate subsequent steps, operating in each step, except the first step, in the presence of the polymer formed and the catalyst used in the preceding step. The catalyst is added only in the first step, however its activity is such that it is still active for all the subsequent steps.

The polymerization, which can be continuous or batch, is carried out following known techniques and operating in liquid phase, in the presence or not of inert diluent, or in gas phase, or by mixed liquid-gas techniques. It is preferable to carry out the polymerization in gas phase.

Reaction time, pressure and temperature relative to the polymerization steps are not critical, however it is best if the temperature is from 50 to 100° C. The pressure can be atmospheric or higher.

The regulation of the molecular weight is carried out by using known regulators, hydrogen in particular.

The said polymerization processes are generally carried out in the presence of stereospecific Ziegler-Natta catalysts supported on magnesium dihalides.

The said stereospecific catalysts used in the polymerization comprise the product of the reaction between:
1) a solid component, containing a titanium compound and an electron-donor compound (internal electron-donor) supported on magnesium dihalide (preferably chloride);
2) an aluminum alkyl compound (cocatalyst); and, optionally,
3) an electron-donor compound (external electron-donor).

Said catalysts are preferably capable of producing homopolymer polypropylene having an isotactic index higher than 90%.

The solid catalyst component (1) contains as electron-donor a compound generally selected among the ethers, ketones, lactones, compounds containing N, P and/or S atoms, and mono- and dicarboxylic acid esters.

Catalysts having the above mentioned characteristics are well known in the patent literature; particularly advantageous are the catalysts described in U.S. Pat. No. 4,399,054 and European patent 45977.

Particularly suited among the said electron-donor compounds are phthalic acid esters and succinic acid esters.

Suitable succinic acid esters are represented by the formula (I):

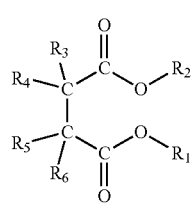

wherein the radicals $R_1$ and $R_2$, equal to or different from each other, are a $C_1$-$C_{20}$ linear or branched alkyl, alkenyl, cycloalkyl, aryl, arylalkyl or alkylaryl group, optionally containing heteroatoms; the radicals $R_3$ to $R_6$ equal to or different from each other, are hydrogen or a $C_1$-$C_{20}$ linear or branched alkyl, alkenyl, cycloalkyl, aryl, arylalkyl or alkylaryl group, optionally containing heteroatoms, and the radicals $R_3$ to $R_6$ which are joined to the same carbon atom can be linked together to form a cycle.

$R_1$ and $R_2$ are preferably $C_1$-$C_8$ alkyl, cycloalkyl, aryl, arylalkyl and alkylaryl groups. Particularly preferred are the compounds in which $R_1$ and $R_2$ are selected from primary alkyls and in particular branched primary alkyls. Examples of suitable $R_1$ and $R_2$ groups are methyl, ethyl, n-propyl, n-butyl, isobutyl, neopentyl, 2-ethylhexyl. Particularly preferred are ethyl, isobutyl, and neopentyl.

One of the preferred groups of compounds described by the formula (I) is that in which $R_3$ to $R_5$ are hydrogen and $R_6$ is a branched alkyl, cycloalkyl, aryl, arylalkyl and alkylaryl radical having from 3 to 10 carbon atoms. Another preferred group of compounds within those of formula (I) is that in which at least two radicals from $R_3$ to $R_6$ are different from hydrogen and are selected from $C_1$-$C_{20}$ linear or branched alkyl, alkenyl, cycloalkyl, aryl, arylalkyl or alkylaryl group, optionally containing heteroatoms. Particularly preferred are the compounds in which the two radicals different from hydrogen are linked to the same carbon atom. Furthermore, also the compounds in which at least two radicals different from hydrogen are linked to different carbon atoms, that is $R_3$ and $R_5$ or $R_4$ and $R_6$ are particularly preferred. Other electron-donors particularly suited are the 1,3-diethers, as illustrated in published European patent applications EP-A-361 493 and 728769.

As cocatalysts (2), one preferably uses the trialkyl aluminum compounds, such as Al-triethyl, Al-triisobutyl and Al-tri-n-butyl.

The electron-donor compounds (3) that can be used as external electron-donors (added to the Al-alkyl compound) comprise the aromatic acid esters (such as alkylic benzoates), heterocyclic compounds (such as the 2,2,6,6-tetramethylpiperidine and the 2,6-diisopropylpiperidine), and in particular silicon compounds containing at least one Si—OR bond (where R is a hydrocarbon radical). The previously said 1,3-diethers are also suitable to be used as external donors. In the case that the internal donor is one of the said 1,3-diethers, the external donor can be omitted.

The catalysts may be precontacted with small quantities of olefin (prepolymerization), maintaining the catalyst in suspension in a hydrocarbon solvent, and polymerizing at temperatures from room to 60° C., thus producing a quantity of polymer from 0.5 to 3 times the weight of the catalyst.

The operation can also take place in liquid monomer, producing, in this case, a quantity of polymer up to 1000 times the weight of the catalyst.

Other catalysts that may be used in the process for preparing the masterbatch composition according to the present invention are metallocene-type catalysts, as described in U.S. Pat. No. 5,324,800 and EP-A-0 129 368; particularly advantageous are bridged bis-indenyl metallocenes, for instance as described in U.S. Pat. No. 5,145,819 and EP-A-0 485 823. Another class of suitable catalysts are the so-called constrained geometry catalysts, as described in EP-A-0 416 815 (Dow), EP-A-0 420 436 (Exxon), EP-A-0 671 404, EP-A-0 643 066 and WO 91/04257. These metallocene compounds may be used in particular to produce the components (B) and (C).

The masterbatch composition of the present invention can also contain additives commonly employed in the art, such as antioxidants, light stabilizers, heat stabilizers, colorants and fillers.

As previously said, the masterbatch composition of the present invention can be advantageously compounded with additional polyolefins, in particular propylene polymers such as propylene homopolymers, random copolymers, and thermoplastic elastomeric polyolefin compositions. Accordingly, a second embodiment of the invention relates to a thermoplastic polyolefin composition suitable for injection molding, containing the above-defined masterbatch compositions. Preferably, the said thermoplastic polyolefin composition comprises up to 60% by weight, typically from 20% to 60% by weight, more preferably from 20% to 40% by weight of the masterbatch composition according to the present invention.

Practical examples of the polyolefins to which the masterbatch is added (i.e. the polyolefins other than those present in the masterbatch) are the following polymers:

1) crystalline propylene homopolymers, in particular isotactic or mainly isotactic homopolymers;
2) crystalline propylene copolymers with ethylene and/or a $C_4$-$C_{10}$ α-olefin, wherein the total comonomer content ranges from 0.05 to 20% by weight with respect to the weight of the copolymer, and wherein preferred α-olefins are 1-butene; 1-hexene; 4-methyl-1-pentene and 1-octene;
3) crystalline ethylene homopolymers and copolymers with propylene and/or a $C_4$-$C_{10}$ α-olefin, such as HDPE;
4) elastomeric copolymers of ethylene with propylene and/or a $C_4$-$C_{10}$ α-olefins, optionally containing minor quantities of a diene, such as butadiene, 1,4-hexadiene, 1,5-hexadiene and ethylidene-1-norbornene, wherein the diene content is typically from 1 to 10% by weight;
5) a thermoplastic elastomeric composition comprising one or more of propylene homopolymers and/or the copolymers of item 2) and an elastomeric moiety comprising one or more of the copolymers of item 4), typically prepared according to known methods by mixing the components in the molten state or by sequential polymerization, and generally containing the said elastomeric moiety in quantities from 5 to 80% by weight;
6) blends of two or more of the polymers or compositions of items 1) to 5).

The polyolefin composition may be manufactured by mixing the masterbatch composition and the additional polyolefin(s) together, extruding the mixture, and pelletizing the resulting composition using known techniques and apparatus.

The polyolefin composition may also contain conventional additives such as mineral fillers, colorants and stabilizers. Mineral fillers that can be included in the composition include talc, $CaCO_3$, silica, silicates, such as wollastonite ($CaSiO_3$), clays, diatomaceous earth, titanium oxide and zeolites. Typically the mineral filler is in particle form having an average diameter ranging form 0.1 to 5 micrometers.

The present invention also provides final articles, such as bumpers and fascia, made of the said polyolefin composition.

The practice and advantages of the present invention are disclosed below in the following examples. These Examples are illustrative only, and are not intended to limit the scope of the invention in any manner whatsoever.

The following analytical methods are used to characterize the polymer compositions.
Melt Flow Rate: ASTM-D 1238, condition L.
[η] intrinsic viscosity: determined in tetrahydronaphtalene at 135° C.
Ethylene content: I.R. Spectroscopy.
Flexural Modulus: ISO 178 (injection moulded specimens), measured 24 hours after moulding.
Tensile Strength at yield and at break: ISO 527 (injection moulded specimens), measured 24 hours after moulding.
Elongation at yield and at break: ISO 527 (injection moulded specimens), measured 24 hours after moulding.
Notched Izod impact test: ISO 180/1A, measured at 23° C., −20° C. and −30° C., 24 hours after moulding.

Xylene Soluble and Insoluble Fractions 2.5 g of polymer and 250 $cm^3$ of xylene are introduced in a glass flask equipped with a refrigerator and a magnetical stirrer. The temperature is raised in 30 minutes up to the boiling point of the solvent. The so obtained clear solution is then kept under reflux and stirring for further 30 minutes. The closed flask is then kept for 30 minutes in a bath of ice and water and in thermostatic water bath at 25° C. for 30 minutes as well. The so formed solid is filtered on quick filtering paper. 100 $cm^3$ of the filtered liquid is poured in a previously weighed aluminum container which is heated on a heating plate under nitrogen flow, to remove the solvent by evaporation. The container is then kept in an oven at 80° C. under vacuum until constant weight is obtained. The weight percentage of polymer soluble in xylene at room temperature is then calculated.

The percent by weight of polymer insoluble in xylene at room temperature is considered the isotacticity index of the polymer. This value corresponds substantially to the isotacticity index determined by extraction with boiling n-heptane, which by definition constitutes the isotacticity index of polypropylene.

Longitudinal and Transversal Shrinkage

A plaque of 100×200×2.5 mm is moulded in an injection moulding machine "SANDRETTO serie 7 190" (where 190 stands for 190 tons of clamping force).

The injection conditions are:
melt temperature=250° C.;
mould temperature=40° C.;
injection time=8-9 seconds;
holding time=20 seconds;
screw diameter=50 mm, with length/diameter (L/D) of 22.

The plaque is measured 24 hours after moulding, using the measuring instrument MICROVAL (COORD 3), and the shrinkage is given by:

$$\text{Longitudinal shrinkage} = \frac{200 - \text{read\_value}}{200} \times 100$$

$$\text{Transversal shrinkage} = \frac{100 - \text{read\_value}}{100} \times 100$$

wherein 200 is the length (in mm) of the plaque along the flow direction, measured immediately after moulding;
100 is the length (in mm) of the plaque crosswise the flow direction, measured immediately after moulding;
the read_value is the plaque length in the relevant direction.

EXAMPLES 1 AND 2 AND COMPARATIVE EXAMPLE 1C

Preparation of the Masterbatch Composition

The solid catalyst component used in polymerization is a highly stereospecific Ziegler-Natta catalyst component supported on magnesium chloride, containing about 2.2% by weight of titanium and diisobutylphthalate as internal donor, prepared by analogy with the method described in Example 3 of European published patent application 395083.

Catalyst System and Prepolymerization Treatment

Before introducing it into the polymerization reactors, the solid catalyst component described above is contacted at −5° C. for 5 minutes with aluminum triethyl (TEAL) and dicyclopentyldimethoxysilane (DCPMS), in a TEAL/DCPMS weight ratio equal to about 5 and in such quantity that the TEAL/solid catalyst component weight ratio be equal to 5.

The catalyst system is then subjected to prepolymerization by maintaining it in suspension in liquid propylene at 25° C. for about 30 minutes before introducing it into the first polymerization reactor.

Polymerization

Into a first gas phase polymerization reactor a propylene homopolymer (component (A)) is produced by feeding in a continuous and constant flow the prepolymerized catalyst system, hydrogen (used as molecular weight regulator) and propylene in the gas state.

The polypropylene produced in the first reactor is discharged in a continuous flow and, after having been purged of unreacted monomers, is introduced, in a continuous flow, into a second gas phase polymerization reactor, together with quantitatively constant flows of hydrogen, ethylene and propylene in the gas state.

The polymer coming from the second reactor is discharged in a continuous flow and, after having been purged of unreacted monomers, is introduced, in a continuous flow, into a third gas phase polymerization reactor, together with quantitatively constant flows of hydrogen, propylene and ethylene in the gas state.

In the second and third reactors propylene/ethylene copolymers (components (B) and (C)) are thus produced. Polymerization conditions, molar ratio of the reactants and composition of the copolymers obtained are shown in Table 1.

The polymer particles exiting the third reactor are subjected to a steam treatment to remove the reactive monomers and volatile substances, and then dried.

The polymer particles are mixed with usual stabilisers in a twin screw extruder Berstorff ZE 25 (length/diameter ratio of screws: 33) and extruded under nitrogen atmosphere in the following conditions:

Rotation speed: 250 rpm;
Extruder output: 6-20 kg/hour;
Melt temperature: 200-250° C.

The characteristics relating to the polymer compositions, reported in Table 2, are obtained from measurements carried out on the so extruded polymer.

In Table 2, under Example 1C, is also reported, for comparison purpose, a masterbatch polymer composition (stabilized as above described) comprising (all percentages by weight):

A) 30% of a homopolymer of propylene having a MFR L value of 85 g/10 min. and a content of fraction soluble in xylene at room temperature of 3.5%;
B) 70% of a copolymer of propylene with ethylene, containing 69% of ethylene.

The composition is obtained by way of sequential polymerization with the catalyst and the process described in Example 3 of WO2005103140.

TABLE 1

| Example No. | | 1 | 2 |
|---|---|---|---|
| 1$^{st}$ Reactor (component (A)) | | | |
| Temperature | ° C. | 65 | 65 |
| Pressure | barg | 18 | 18 |
| H2/C3- | mol. | 0.11 | 0.11 |
| Split | wt % | 32 | 26 |
| MFR | g/10' | 88 | 91 |
| Xylene soluble | wt % | 3.1 | 2.9 |
| 2$^{nd}$ Reactor (component (B)) | | | |
| Temperature | ° C. | 60 | 60 |
| Pressure | barg | 18 | 18 |
| H2/C2- | mol. | 0.17 | 0.18 |

TABLE 1-continued

| Example No. | | 1 | 2 |
|---|---|---|---|
| C2-/(C2- + C3-) | mol. | 0.16 | 0.16 |
| Split | wt % | 24 | 24 |
| C2- content (copolymer) | wt % | 34 | 33 |
| MFR | g/10' | 8.9 | 7.8 |
| Xylene soluble | wt % | 39.1 | 42.3 |
| 3$^{rd}$ Reactor (component (C)) | | | |
| Temperature | ° C. | 60 | 60 |
| Pressure | barg | 18 | 18 |
| H2/C2- | mol. | 0.46 | 0.55 |
| C2-/(C2- + C3-) | mol. | 0.51 | 0.51 |
| Split | wt % | 44 | 50 |
| C2- content (copolymer) | wt % | 70 | 70 |

Notes:
C3- = propylene; C2- = ethylene; split = amount of polymer produced in the concerned reactor; C2- content (copolymer) = ethylene content with respect to the copolymer prepared in the concerned reactor.

TABLE 2

| Example No. | | 1 | 2 | 1C |
|---|---|---|---|---|
| MFR L | g/10' | 4.4 | 3.4 | 4.8 |
| Xylene soluble | wt % | 53.3 | 56.9 | 45.6 |
| C2- content | wt % | 40.1 | 44.3 | 46.3 |
| X.S.I.V. | dl/g | 2.19 | 2.21 | 1.72 |

Notes:
X.S.I.V = Intrisic Viscosity of the fraction soluble in xylene.

Preparation of Blends of the Stabilized Masterbatch Composition with Propylene Polymers The stabilized masterbatch compositions prepared as described above (hereinafter called SMC) are blended by extrusion under the previously described conditions with a heterophasic polypropylene composition (hereinafter called HPP) and the other additives hereinafter described, in the proportions reported below and in Table 3. The properties of the so obtained final compositions are reported in Table 3.

Added Components

1 PP-1: propylene homopolymer containing 3% by weight of fraction soluble in xylene at room temperature and having a MFR L value of 120 g/10 min.;
2 PP-2: propylene homopolymer containing 3.5% by weight of fraction soluble in xylene at room temperature and having a MFR L value of 10 g/10 min.;
3 Irganox® B 225: made of about 50% Irganox® 1010 and 50% Irgafos® 168.

In all the examples, the added amount of component 3 is of 0.2% by weight.

TABLE 3

| SMC of EXAMPLE | 1 | 2 | 1C |
|---|---|---|---|
| SMC amount (wt %) | 29.8 | 27.3 | 29.8 |
| PP-1 amount (wt %) | 19 | 20 | 25 |
| PP-2 amount (wt %) | 51 | 52 | 45 |
| Flexural modulus (MPa) | 954 | 948 | 1005 |
| Tensile strength at yield (MPa) | 22.9 | 22.5 | 23.2 |
| Elongation at yield (% a) | 10 | 10.2 | 9.9 |
| Tensile strength at break (MPa) | 16.5 | 16.5 | 19 |
| Elongation at break (%) | 650 | 581 | 32 |
| IZOD Impact Str. at 23° C (KJ/m$^2$) | 6.8 | 6.8 | 3.9 |
| IZOD Impact Str. at −20° C (KJ/m$^2$) | 3.4 | 3.4 | 2.5 |
| IZOD Impact Str. at −30° C (KJ/m$^2$) | 3.3 | 3.6 | 2.4 |
| Longitudinal shrinkage (%) | 1.27 | 1.21 | 1.14 |
| Transversal shrinkage (%) | 1.34 | 1.27 | 1.23 |
| MFR (g/10 min) | 15.7 | 15 | 20.2 |

The invention claimed is:

1. A masterbatch composition comprising, all percent amounts being by weight:
   A) 10-45% of a homopolymer of propylene or a copolymer of propylene with one or more comonomer(s) selected from ethylene and CH$_2$=CHR alpha-olefins where R is a 2-8 carbon alkyl, which copolymer contains from 1 to 8% of comonomer(s);
   B) 10-30% of a copolymer of propylene with ethylene, containing from 18 to 45% of ethylene;
   C) 42-60% of a copolymer of propylene with ethylene, containing from 55 to 85% of ethylene;
said composition having an MFR L value from 0.01 to 10 g/10 min., a value of the intrinsic viscosity $[\eta]_{sol}$ of the fraction soluble in xylene at room temperature from 1.5 to 2.5 dl/g and a value of the ratio $[\eta]_{sol}$/MFR L equal to or lower than 6.

2. The masterbatch composition of claim 1, wherein component (A) has a MFR L value from 70 to 130 g/10 min.

3. A thermoplastic polyolefin composition containing a masterbatch composition comprising, all percent amounts being by weight:
   A) 10-45% of a homopolymer of propylene or a copolymer of propylene with one or more comonomer(s) selected from ethylene and CH$_2$=CHR alpha-olefins where R is a 2-8 carbon alkyl, which copolymer contains from 1 to 8% of comonomer(s);
   B) 10-30% of a copolymer of propylene with ethylene, containing from 18 to 45% of ethylene;
   C) 42-60% of a copolymer of propylene with ethylene, containing from 55 to 85% of ethylene;
said composition having an MFR L value from 0.01 to 10 g/10 min., a value of the intrinsic viscosity $[\eta]_{sol}$ of the fraction soluble in xylene at room temperature from 1.5 to 2.5 dl/g and a value of the ratio $[\eta]_{sol}$/MFR L equal to or lower than 6.

4. The thermoplastic polyolefin composition of claim 3, wherein the olefin polymers other than those contained in the masterbatch composition are selected from the group consisting of:
   1) crystalline propylene homopolymers;
   2) crystalline copolymers of propylene with at least one of ethylene and a C$_4$-C$_{10}$ α-olefin, wherein the total comonomer content ranges from 0.05 to 20% by weight with respect to the weight of the copolymer;
   3) crystalline ethylene homopolymers and copolymers with at least one of propylene and a C$_4$-C$_{10}$ α-olefin;
   4) elastomeric copolymers of ethylene with at least one of propylene and a C$_4$-C$_{10}$ α-olefin, optionally containing minor quantities of a diene;
   5) a thermoplastic elastomeric composition comprising at least one of propylene homopolymers and the copolymers of item 2) and an elastomeric moiety comprising at least one of the copolymers of item 4), containing the said elastomeric moiety in quantities from 5 to 80% by weight;
   6) blends of at least two of the polymers or compositions of items 1) to 5).

5. The thermoplastic polyolefin composition of claim 3, wherein the content of masterbatch composition is from 20% to 60% by weight with respect to the total weight of the thermoplastic composition.

6. The masterbatch composition of claim 1, wherein the masterbatch composition is formed by a process comprising the steps of:
   polymerizing in at least three sequential steps, wherein components (A), (B) and (C) are prepared in separate subsequent steps, operating in each step, except the first step, in the presence of the polymer formed and the catalyst used in the preceding step.

7. The thermoplastic polyolefin composition of claim 3, wherein the composition is a bumper or a fascia.

8. The masterbatch of claim 1 wherein the value of the ratio $[\eta]_{sol}$/MFR L is equal to or lower than 2.

* * * * *